US012624144B2

(12) United States Patent (10) Patent No.: US 12,624,144 B2
Liu et al. (45) Date of Patent: May 12, 2026

(54) METHOD FOR PREPARING HOLLOW COVALENT ORGANIC FRAMEWORK MATERIALS

(71) Applicant: Zhejiang University, Zhejiang (CN)

(72) Inventors: Pingwei Liu, Zhejiang (CN); Wen-Jun Wang, Zhejiang (CN); Song Wang, Zhejiang (CN)

(73) Assignee: Zhejiang University, Zhejiang (CN)

( * ) Notice: Subject to any disclaimer, the term of this patent is extended or adjusted under 35 U.S.C. 154(b) by 1021 days.

(21) Appl. No.: 17/773,163

(22) PCT Filed: Sep. 24, 2020

(86) PCT No.: PCT/CN2020/117511
§ 371 (c)(1),
(2) Date: Apr. 29, 2022

(87) PCT Pub. No.: WO2022/061666
PCT Pub. Date: Mar. 31, 2022

(65) Prior Publication Data
US 2024/0182624 A1 Jun. 6, 2024

(51) Int. Cl.
*C08G 12/08* (2006.01)
*B01J 13/14* (2006.01)
*C08G 12/40* (2006.01)

(52) U.S. Cl.
CPC .............. *C08G 12/08* (2013.01); *B01J 13/14* (2013.01); *C08G 12/40* (2013.01)

(58) Field of Classification Search
None
See application file for complete search history.

(56) References Cited

U.S. PATENT DOCUMENTS

2012/0040282 A1* 2/2012 Heuft .................. G03G 5/0596
430/58.05
2014/0272154 A1* 9/2014 Wigglesworth ......... C09D 5/00
427/384

FOREIGN PATENT DOCUMENTS

| CN | 103755588 A | 4/2014 |
| CN | 106832268 A | 6/2017 |
| CN | 107028832 A | 8/2017 |
| CN | 108822301 A | 11/2018 |
| CN | 109627250 A | 4/2019 |
| CN | 110256645 A | 9/2019 |
| CN | 110487735 A | 11/2019 |
| CN | 110523354 A | 12/2019 |
| WO | 2016/030913 A2 | 3/2016 |

OTHER PUBLICATIONS

Melamine Pyrophosphate Safety Datasheet (Year: 2015).*
Fang, L., et al., (Investigation of the Flame-Retardant and Mechanical Properties of Bamboo Fiber-Reinforced Polypropylene Composites with Melamine Pyrophosphate and Aluminum Hypophosphite Addition Materials 2020, 13, 479) (Year: 2020).*
Zhu, D. et al., (Enhancement of crystallinity of imine-linked covalent organic frameworks via aldehyde modulators Polym. Chem., Jul. 2020, 11, 4464-4468). (Year: 2020).*
Hu, J., et al., (Applications of Dynamic Covalent Chemistry Concept towardTailored Covalent Organic Framework Nanomaterials: A Review, ACS Appl. Nano Mater. 2020, 3, 6239-6269). (Year: 2020).*
Song Wang, et al., "Core-Shell and Yolk-Shell Covalent Organic Framework Nanostructures with Size-Selective Permeability", Cell Reports Physical Science 1, 100062, Jun. 24, 2020, https://doi.org/10.1016/j.xcrp.2020.100062, pp. 1-16.
PCT International Search Report for PCT Application No. PCT/CN2020/117511 mailed Jun. 28, 2021 (7 pages, with English translation).
PCT Written Opinion for PCT Application No. PCT/CN2020/117511 mailed Jun. 28, 2021 (3 pages).
Kandambeth et al., "Self-templated chemically stable hollow spherical covalent organic framework," Nature Communications, 2015, vol. 6, 10 pages.
Qian et al., "Toward Covalent Organic Frameworks Bearing Three Different Kinds of Pores: The Strategy for Construction and COF-to-COF Transformation via Heterogeneous Linker Exchange," J. Am. Chem. Soc., 2017, 139:6736-6743.

* cited by examiner

*Primary Examiner* — Robert S Jones, Jr.
*Assistant Examiner* — Lily K Sloan
(74) *Attorney, Agent, or Firm* — Merchant & Gould P.C.

(57) ABSTRACT

The present invention relates to a method for preparing a hollow covalent organic framework (COF) material and hollow COF material prepared by said method. Said method is characterized in including a monomer displacement step in the method, thereby obtaining the hollow COF material with a controllable particle size, wall thickness and/or specific surface area.

10 Claims, No Drawings

METHOD FOR PREPARING HOLLOW COVALENT ORGANIC FRAMEWORK MATERIALS

CROSS-REFERENCE TO RELATED APPLICATIONS

This application is a U.S. National Stage Application of PCT/CN2020/117511, filed 24 Sep. 2020, and which application is incorporated herein by reference. To the extent appropriate, a claim of priority is made to the above disclosed application.

TECHNICAL FIELD

The present invention relates to a method for preparing a hollow covalent organic framework (COF) material and hollow COF material prepared by said method. Said method is characterized in including monomer displacement step in the method, thereby obtaining the hollow COF material with a controllable particle size, wall thickness and/or specific surface area.

BACKGROUND ART

Covalent organic framework (COF) materials are known organic porous materials, which are crystalline materials with periodic regular hole structure formed from rigid organic monomers via covalent bonding, and have a wide variety of applications in catalysis, separation, storage, energy, drug release, and the like.

The COFs prepared by conventional methods are generally of irregular solid spherical structure, unable to achieve a precise customization of micro-scale structure, which thus limits the application range thereof.

The COFs having a hollow spherical structure and uniform particle size can realize the compounding with functional nanomaterials, and the performances of the COFs in the applications such as drug release, storage and the like are greatly improved. US20170247493A1 discloses a method for preparing hollow Schiff base COFs without template, but this method is merely suitable for some special monomers, and cannot regulate the wall thickness, particle size of the hollow COFs. CN104772088A discloses a method for preparing hollow COFs via a homogeneous reaction, but this method cannot regulate the size, wall thickness of the hollow COFs either.

Content of Invention

The inventor has found that the drawbacks of the prior art can be overcome by a monomer displacement strategy, thereby preparing hollow COF materials with controllable particle size, wall thickness and/or specific surface area, or modifying certain solid and hollow COF materials of the prior art, for example, changing the wall thickness and/or specific surface area thereof, and the like.

Thus, on one aspect, present invention relates to a method for preparing a hollow COF material, comprising:
1) subjecting trialdehyde monomer B3 and diamine monomer A2 to polycondensation to obtain a polycondensate B3A2, or subjecting dialdehyde monomer B2 and triamine monomer A3 to polycondensation to obtain a polycondensate B2A3;
2) dissolving triamine monomer A3 into a solvent and adding modifiers AP and BP to obtain reaction solution 1; or dissolving trialdehyde monomer B3 into a solvent and adding modifiers AP and BP to obtain reaction solution 2;
3) dispersing the polycondensate B3A2 into the reaction solution 1, or dispersing the polycondensate B2A3 into the reaction solution 2, and adding a catalyst to initiate a reaction, thereby obtaining a product A3B3 in form of a precipitate; and
4) after the reaction, separating resulting product A3B3 and dying to obtain the hollow COF material.

The trialdehyde monomer B3 is the one known in the art for preparing COF materials, for example, which can be selected from (aromatic) trialdehydes and the derivates thereof, their examples include, but not limited to, 1,3,5-benzenetricarboxaldehyde, 2,4,6-trihydroxy-benzenetricarboxaldehyde, 1,3,5-tris(4-aldehydephenyl)benzene, 2,4,6-tris(4-aldehydephenyl)-1,3,5-triazine, 2,4,6-tris(4-aldehydephenyl)-pyridine, 2,4,6-tris(4-aldehydephenyl)-pyrimidine, tris(4-aldehydephenyl)-amine, 1,3,5-tris(4'-aldehyde[1,1'-biphenyl]-4-yl)-benzene, 1,3,5-tris(4'-aldehyde[1,1'-biphenyl]-4-yl)-1,3,5-triazine, 1,3,5-tris(4'-aldehyde[1,1'-biphenyl]-4-yl)-pyridine, 1,3,5-tris(4'-aldehyde[1,1'-biphenyl]-4-yl)-pyrimidine, 1,3,5-tris(4'-aldehyde[1,1'-biphenyl]-4-yl)-amine, and any mixtures thereof. In the present invention, preferred trialdehyde monomer B3 are selected from benzenetricarboxaldehyde, 1,3,5-tris(4-aldehydephenyl)benzene, 2,4,6-tris(4-aldehydephenyl)-1,3,5-triazine, 2,4,6-tris(4-aldehydephenyl)-pyridine, 2,4,6-tris(4-aldehydephenyl)-pyrimidine, and tris(4-aldehydephenyl)-amine. The monomers above are commercially available or prepared by the methods known in the art.

The dialdehyde monomer B2 is the one known in the art for preparing COF materials, for example, which can be selected from (aromatic) dialdehydes and the derivates thereof, their examples include, but not limited to, terephthalaldehyde, biphenyldicarboxaldehyde, 2,5-dihydroxy-terephthalaldehyde, 2,5-dimethoxyterephthalaldehyde, 2,3-dihydroxyterephthalaldehyde, 2,3-dimethoxyterephthalaldehyde, 2,5-dialkynoxyterephthalaldehyde, glyoxal, and any mixtures thereof. In the present invention, preferred dialdehyde monomer B2 are selected from terephthalaldehyde, 2,5-dimethoxyterephthalaldehyde, and biphenyldicarboxaldehyde. The monomers above are commercially available or prepared by the methods known in the art.

The triamine monomer A3 is the one known in the art for preparing COF materials, for example, which are selected from (aromatic) triamines and the derivates thereof, their examples include, but not limited to, 1,3,5-tris(4-aminophenyl)benzene, 2,4,6-tris(4-aminophenyl)-1,3,5-triazine, 2,4,6-tris(4-aminophenyl)-pyridine, 2,4,6-tris(4-aminophenyl)-pyrimidine, tris(4-aminophenyl)-amine, 1,3,5-tris(4'-amino[1,1'-biphenyl]-4-yl)-benzene, 1,3,5-tris(4'-amino[1,1'-biphenyl]-4-yl)-1,3,5-triazine, 1,3,5-tris(4'-amino[1,1'-biphenyl]-4-yl)-pyridine, 1,3,5-tris(4'-amino[1,1'-biphenyl]-4-yl)-pyrimidine, 1,3,5-tris(4'-amino[1,1'-biphenyl]-4-yl)-amine, melamine, and any mixtures thereof. In the present invention, preferred triamine monomer A3 are selected from 1,3,5-tris(4-aminophenyl)benzene, 2,4,6-tris(4-aminophenyl)-1,3,5-triazine, 2,4,6-tris(4-aminophenyl)-pyridine, 2,4,6-tris(4-aminophenyl)-pyrimidine, and tris(4-aminophenyl)-amine. The monomers above are commercially available or can be prepared by the methods known in the art.

The diamine monomer A2 is the one known in the art for preparing COF materials, for example, which can be selected from (aromatic) diamines and the derivates thereof, their examples include, but not limited to, 1,4-phenylene diamine, 2,5-dimethyl-1,4-phenylene diamine, tetramethyl-p-phenylendiamine, benzidine, 3,3'-dinitrobenzidine, 4,4'-diaminoterphenyl, 4,4'-diaminodiphenylethylene, p-diaminoazobenzene, 2,6-anthracenediamine, 3,4-diaminotetrahydrofuran, hydrazine, 1,2-cyclohexanediamine, and any mixtures thereof. In the present invention, preferred diamine monomer A2 are selected from 1,4-phenylene diamine, 2,5-dimethyl-1,4-phenylene diamine, tetramethyl-p-phenylendiamine, and benzidine. The monomers above are commercially available or can be prepared by the methods known in the art.

The polycondensation involved in step 1) is known in the art, and can be carried out in accordance with the method disclosed in Wang, S. et al., "Core-Shell and Yolk-Shell Covalent Organic Framework Nanostructures with Size-Selective Permeability", Cell Reports Physical Science, 2020, No. 1, 100062, pages 1-15, which is incorporated herein by reference.

The solvent involved in step 2) and the amount thereof are known in the art, for example, can be selected from alkanes, aromatics, alcohols, ethers, ketones, esters, amides, sulfoxides, nitriles, water, and the derivatives thereof, its specific examples include, but not limited to, isopentane, N-pentane, petroleum ether, hexane, cyclohexane, isooctane, heptane, carbon tetrachloride, benzene, toluene, xylene, trimethylbenzene, chlorobenzene, dichlorobenzene, ethyl ether, isobutanol, N-butanol, propanol, ethanol, methanol, dichloromethane, chloroform, ethyl acetate, tetrahydrofiran, dioxane, acetone, pyridine, acetonitrile, dimethyl sulfoxide, N,N-dimethylformamide, N,N-dimethylacetamide, water, and combinations thereof.

The modifiers AP and BP involved in step 2) are those known in the art for assisted preparation of COF materials, see, for example, the related content disclosed in Wang, S. et al., "Reversible Polycondensation-Termination Growth of Covalent-Organic-Framework Spheres, Fibers, and Films", Matter, 2019, No. 1, pages 1592-1605.

In the present invention, said modifier AP can be selected from aromatic aldehydes and aliphatic aldehydes, the example thereof includes, but not limited to benzaldehyde, 2-chlorobenzaldehyde, 3-chlorobenzaldehyde, 4-chlorobenzaldehyde, 2-nitrobenzaldehyde, 3-nitrobenzaldehyde, 4-nitrobenzaldehyde, 2-methylbenzaldehyde, 3-methylbenzaldehyde, 4-methylbenzaldehyde, 4-tert-butylbenzaldehyde, 4-fluorobenzaldehyde, 1-naphthaldehyde, 2-naphthaldehyde, formaldehyde, acetaldehyde, propionaldehyde, butyraldehyde, valeraldehyde, capronaldehyde, heptaldehyde, caprylaldehyde, and any mixtures thereof. The modifier AP above is commercially available or can be prepared by the methods known in the art.

For example, said modifier BP can be selected from aromatic amines and aliphatic amines, the example thereof includes, but not limited to aniline, 2-chloroaniline, 3-chloroaniline, 4-chloroaniline, 1,3-benzothiazol-5-amine, 2-nitroaniline, 3-nitroaniline, 4-nitroaniline, 2-methylaniline, 3-methylaniline, 4-methylaniline, 4-tert-butylaniline, 4-fluoroaniline, 1-naphthylamine, 2-naphthylamine, methylamine, ethylamine, propylamine, butylamine, pentylamine, hexylamine, heptylamine, octylamine, cyclohexylamine, and any mixture thereof. The modifier BP above is commercially available or can be prepared by the methods known in the art.

The concentration of triamine monomer A3 or trialdehyde monomer B3 in the reaction solution 1 or 2 is 0.01-100 mM, preferably 0.1-50 mM, more preferably 0.2-25 mM, respectively. The molar ratio of modifier BP to trialdehyde monomer B3 or triamine monomer A3 is 0.01-200:1, preferably 0.1-100:1, more preferably 0.5-50:1, respectively. The molar ratio of modifier AP to BP is 0.01-100:1, preferably 0.1-10:1, more preferably 0.2-5:1.

The step 2) generally employs the equipments known in the art, such as a round-bottom flask, and is carried out at normal temperature and pressure.

The catalysts involved in the step 3) are those known in the art for assisted preparation of COF materials, for example, which can be selected from trifluoromethanesulfonate, carboxylic acid and benzenesulfonic acid and the derivatives thereof, their examples include, but not limited to scandium trifluoromethanesulfonate, europium trifluoromethanesulfonate, indium trifluoromethanesulfonate, ytterbium trifluoromethanesulfonate, yttrium trifluoromethanesulfonate, zinc trifluoromethanesulfonate, methanoic acid, acetic acid, trifluoroacetic acid, benzenesulfonic acid, methylbenzenesulfonic acid, and any mixture thereof.

The concentration of the polycondensate B3A2 or B2A3 in the reaction solution 1 or 2 is 0.01-200 mg/ml, preferably 0.1-50 mg/ml, more preferably 0.2-10 mg/ml, respectively. The concentration of the catalyst in the reaction solution 1 or 2 is 0.001-10 mM, preferably 0.005-6 mM, more preferably 0.01-3 mM, respectively.

The reaction conditions of step 3) are known in the art, for example, the reaction is generally conducted in a round-bottom flask at the temperature of 0-200° C., preferably 0-150° C.; the reaction time is generally 0.01-100 hours, preferably 0.05-80 hours, more preferably 0.1-70 hours. The resulting reaction product A3B3 is in the form of a precipitate.

The separating and drying steps involved in step 4) are known in the art, for example, separating is usually carried out by filtration and drying is carried out via a vacuum oven.

On another aspect, the present invention relates to a method for modifying a known hollow COF material, comprising:

1) providing the known COF material, which is polycondensate B3A2 of trialdehyde monomer B3 and diamine monomer A2 or polycondensate B2A3 of dialdehyde monomer B2 and triamine monomer A3;

2) dissolving triamine monomer A3 into a solvent and adding modifiers AP and BP to obtain reaction solution 1; or dissolving trialdehyde monomer B3 into a solvent and adding modifiers AP and BP to obtain reaction solution 2;

3) dispersing the polycondensate B3A2 into the reaction solution 1, or dispersing the polycondensate B2A3 into the reaction solution 2, and adding a catalyst to initiate a reaction, thereby obtaining product in the form of a precipitate; and 4) after the reaction, separating the resulting product and drying to obtain the hollow COF material.

Said known COF material in step 1) is solid COF material or hollow COF material products known in the art, which are in the form of polycondensate B3A2 or B2A3. For example, said solid COF material or hollow COF material known in the art is a solid COF material with a particle size of 110-560 nm obtained by the condensation of 1,3,5-tris(4-aminophenyl)benzene with terephthalaldehyde reported in Li, R. et al., "Controlled Growth of Imine-Linked Two-Dimensional Covalent Organic Framework Nanoparticles", Chemical Science, 2019, No. 10, pages 3796-3801; or a hollow COF material with a particle size of 400 nm, a wall thickness of 50-100 nm obtained by the condensation of 1,3,5-benzenetricarboxaldehyde with p-phenylenediamine reported in Ding, S. Y. et al., "Construction of Covalent Organic Framework for Catalysis: Pd/COF-LZU1 in Suzuki-Miyaura Coupling Reaction", Journal of the American Chemical Society, 2011, No. 133, pages 19816-19822.

Other features involved in said modifying method are same as those in the above-mentioned preparing method.

The preparing method or modifying method of the present invention is characterized in that, certain solid COF materials and hollow COF materials known in the prior art are modified by steps 2) and 3) to adjust and change the wall thickness and/or specific surface area, etc., or prepare novel hollow COF materials with controllable particle size, wall thickness and/or specific surface area, etc. For example, wall thickness can be increased by controlling the amount of A3 or B3 in step 2); specific surface area can be increased by controlling the amounts of AP and BP in step 2) and the amount of the catalyst in step 3), so as to obtain hollow COF material meeting different requirements.

In yet another aspect, the present invention also relates to a hollow COF material that can be obtained by the above-mentioned preparing method or modifying method, which are characterized by having controllable particle size, wall thickness and/or specific surface area. In general, said hollow COF material has a particle size of 30-100,000 nm, preferably 100-20,000 nm; a particle size distribution of 1-8, preferably 1-3; a ratio of wall thickness to particle size of 0.01-0.99:1, preferably 0.05-0.80:1; a specific surface area of 200-3500 m$^2$/g, preferably 400-2800 m$^2$/g.

The hollow COF material obtained by the preparing method or the modifying method of the present invention can be widely used in various fields such as catalysis, separation, storage, energy, drug release and the like. Because the hollow COF materials with controllable particle size, wall thickness and/or specific surface area can be prepared by the present method, specific hollow COF materials can be prepared as desired for specific applications.

EXAMPLES

The inventive specific embodiments are illustrated by the following examples, but the these examples are only illustrative and, in no way should be read to limit the scope of present invention.

In the examples, the particle size and wall thickness are measured by transmission electron microscopy (HT-7700 from Hitachi Ltd), and the specific surface area is determined by nitrogen adsorption test using a specific surface area analyzer (AUTOSORB-IQ2-MP).

Comparative Example 1: preparation of (1,3,5-tris(4-aminophenyl) benzene, 1,3,5-benzenetricarboxaldehyde) COF material A polycondensate (1,3,5-tris(4-aminophenyl)benzene, 1,3,5-benzenetricarboxaldehyde) COF material was prepared according to the prior art (Montoro, C. et al., "Ionic Conductivity and Potential Application for Fuel Cell of a Modified Imine-Based Covalent Organic Framework", Journal of the American Chemical Society, 2017, 139, 10079-10086), which is a random, solid COF material with a specific surface area of 330-750 m$^2$/g.

Example 1: Preparation of a Hollow COF1 Material 1 mmol of 1,3,5-tris(4-aminophenyl)benzene and 1.5 mmol terephthalaldehyde were dissolved in 200 ml of acetonitrile, reacted for 24 hours at room temperature under the catalysis of 44.0 μmol of scandium trifluoromethanesulfonate, filtered and dried in a vacuum oven at 50° C. for 12 hours, obtaining the polycondensate: (terephthalaldehyde, 1,3,5-tris(4-aminophenyl)benzene) COF, which is composed of solid spherical particles with a particle size of 210 nm, and a specific surface area of 54 m$^2$/g;

40.0 μmol 1,3,5-benzenetricarboxaldehyde was dissolved in 20 ml of dioxane/mesitylene (in a volume ratio of 1/2), added 1.2 mmol aniline and 1.2 mmol benzaldehyde to prepare a reaction solution;

40 mg (terephthalaldehyde, 1,3,5-tris(4-aminophenyl) benzene) COF was dispersed into said reaction solution, added 3.0 μmol scandium trifluoromethanesulfonate, then reacted at 25° C. for 24 hours;

The COF obtained in the reaction was filtered by suction filtration, washed with ethanol 3 times, dried under vacuum at 40° C., obtaining the hollow COF1 material.

The resulting hollow COF1 material has a particle size of 220±9 nm, a wall thickness of 35 nm and a specific surface area of 1337 m$^2$/g.

Example 2: Preparation of a Hollow COF2 Material 1 mmol of 1,3,5-tris(4-aminophenyl)benzene and 1.5 mmol terephthalaldehyde were dissolved in 200 ml of acetonitrile, reacted for 24 hours at room temperature under the catalysis of 44.0 μmol of scandium trifluoromethanesulfonate, filtered and dried in a vacuum oven at 50° C. for 12 hours, obtaining the polycondensate: (terephthalaldehyde, 1,3,5-tris(4-aminophenyl)benzene) COF, which is composed of solid spherical particles with a particle size of 210 nm, and a specific surface area of 54 m$^2$/g;

80.0 μmol 1,3,5-benzenetricarboxaldehyde was dissolved in 20 ml of dioxane/mesitylene (in a volume ratio of 1/2), added 1.2 mmol aniline and 1.2 mmol benzaldehyde to prepare a reaction solution;

40 mg (terephthalaldehyde, 1,3,5-tris(4-aminophenyl) benzene) COF was dispersed into said reaction solution, added 3.0 μmol scandium trifluoromethanesulfonate, then reacted at 25° C. for 24 hours;

The COF obtained in the reaction was filtered by suction filtration, washed with ethanol 3 times, dried under vacuum at 40° C., obtaining the hollow COF2 material.

The resulting hollow COF2 material has a particle size of 225±10 nm, a wall thickness of 45 nm and a specific surface area of 730 m$^2$/g.

Example 3: Preparation of a Hollow COF3 Material 1 mmol of 1,3,5-tris(4-aminophenyl)benzene and 1.5 mmol terephthalaldehyde were dissolved in 200 ml of acetonitrile, reacted for 24 hours at room temperature under the catalysis of 44.0 μmol of scandium trifluoromethanesulfonate, filtered and dried in a vacuum oven at 50° C. for 12 hours, obtaining the polycondensate: (terephthalaldehyde, 1,3,5-tris(4-aminophenyl)benzene) COF, which is composed of solid spherical particles with a particle size of 210 nm, and a specific surface area of 54 m$^2$/g; 2 μmol 1,3,5-benzenetricarboxaldehyde was dissolved in 10 ml of ethyl acetate, added 1 mol aniline and 0.2 μmol benzaldehyde to prepare a reaction solution;

2 mg (terephthalaldehyde, 1,3,5-tris(4-aminophenyl) benzene) COF was dispersed into said reaction solution, added 0.1 μmol scandium trifluoromethanesulfonate, then reacted at 5° C. for 0.1 hour;

The COF obtained in the reaction was filtered by suction filtration, washed with ethanol 3 times, dried under vacuum at 50° C., obtaining the hollow COF3 material.

The resulting hollow COF3 material has a particle size of 220±140 nm, a wall thickness of 23 nm and a specific surface area of 620 m²/g.

Example 4: Preparation of a Hollow COF4 Material 1 mmol 1,3,5-benzenetricarboxaldehyde and 1.5 mmol 1,4-phenylene diamine were dissolved in 100 ml of acetonitrile, reacted for 24 hours at room temperature under the catalysis of 60.0 μmol of scandium trifluoromethanesulfonate, filtered and dried in a vacuum oven at 50° C. for 12 hours, obtaining the polycondensate: (1,3,5-benzenetricarboxaldehyde, 1,4-phenylene diamine) COF, which is composed of solid spherical particles with a particle size of 1010 nm, and a specific surface area of 354 m²/g;

10 μmol of 1,3,5-tris(4-aminophenyl) benzene was dissolved in 20 ml of mesitylene/dioxane (in a volume ratio of 1/2), added 8 μmol aniline and 3.2 μmol of 3-chlorobenzaldehyde to prepare a reaction solution;

2 mg (1,3,5-benzenetricarboxaldehyde, 1,4-phenylene diamine) COF was dispersed into the reaction solution, added 0.4 μmol scandium trifluoromethanesulfonate, then reacted at 10° C. for 0.5 hours;

The COF obtained in the reaction was filtered by suction filtration, washed with acetone 3 times, dried under vacuum at 60° C., obtaining the hollow COF4 material.

The resulting hollow COF4 material has a particle size of 1130±410 nm, a wall thickness of 115 nm and a specific surface area of 820 m²/g.

Example 5: Preparation of a Hollow COF5 Material 1 mmol of 2,4,6-tris(4-aminohenyl)-1,3,5-triazine and 1.5 mmol biphenyldicarboxaldehyde were dissolved in 150 ml of dioxane/mesitylene (in a volume ratio of 2/1), reacted for 24 hours at room temperature under the catalysis of 60.0 μmol of scandium trifluoromethanesulfonate, filtered and dried in a vacuum oven at 50° C. for 12 hours, obtaining the polycondensate: (biphenyldicarboxaldehyde, 2,4,6-tris(4-aminohenyl)-1,3,5-triazine) COF, which is composed of solid spherical particles with a particle size of 260 nm, and a specific surface area of 438 m²/g;

5 μmol of 1,3,5-tris(4-aldehydephenyl) benzene was dissolved in 10 ml of mesitylene/dioxane (in a volume ratio of 2/1), added 5 μmol of 4-chloroaniline and 4 μmol benzaldehyde to prepare a reaction solution;

5 mg (biphenyldicarboxaldehyde, 2,4,6-tris(4-aminohenyl)-1,3,5-triazine) COF was dispersed into the reaction solution, added 0.5 μmol yttrium trifluoromethanesulfonate catalyst, then reacted at 15° C. for 1 hour;

The COF obtained in the reaction was filtered by suction filtration, washed with tetrahydrofuran 3 times, dried under vacuum at 55° C., obtaining the hollow COF5 material.

The resulting hollow COF5 material has a particle size of 270±180 nm, a wall thickness of 54 nm and a specific surface area of 910 m²/g.

Example 6: Preparation of a Hollow COF6 Material 1 mmol of 1,3,5-tris(4-aldehydephenyl)benzene and 1.5 mmol of 2,5-dimethyl-1,4-phenylene diamine were dissolved in 50 ml of dioxane/mesitylene (in a volume ratio of 2/1), reacted for 24 hours at room temperature under the catalysis of 70.0 μmol of scandium trifluoromethanesulfonate, filtered and dried in a vacuum oven at 50° C. for 12 hours, obtaining the polycondensate: (1,3,5-tris(4-aldehydephenyl)benzene, 2,5-dimethyl-1,4-phenylene diamine) COF, which is composed of solid spherical particles with a particle size of 113 nm, and a specific surface area of 560 m²/g;

30 μmol of 2,4,6-tris(4-aminohenyl)-1,3,5-triazine was dissolved in 30 ml of hexane/dioxane (in a volume ratio of 1/2), added 45 μmol of 2-nitroaniline and 45 μmol of 3-nitrobenzaldehyde to prepare a reaction solution;

30 mg (1,3,5-tris(4-aldehydephenyl) benzene, 2,5-dimethyl-1,4-phenylene diamine) COF was dispersed into the reaction solution, added 3 μmol europium trifluoromethanesulfonate, then reacted at 20° C. for 4 hours;

The COF obtained in the reaction was filtered by suction filtration, washed with n-hexane 3 times, dried under vacuum at 60° C., obtaining the hollow COF6 material.

The resulting hollow COF6 material has a particle size of 12026 nm, a wall thickness of 16 nm and a specific surface area of 1350 m²/g.

Example 7: Preparation of a Hollow COF7 Material 1 mmol of 2,4,6-tris(4-aminophenyl)-pyridine and 1.5 mmol terephthalaldehyde were dissolved in 50 ml of dioxane/mesitylene (in a volume ratio of 2/1), added 5 ml of acetic acid catalyst, reacted for 24 hours at room temperature, filtered and dried in a vacuum oven at 50° C. for 12 hours, obtaining the polycondensate (terephthalaldehyde, 2,4,6-tris(4-aminophenyl)-pyridine) COF, which is composed of solid spherical particles with a particle size of 12000 nm, and a specific surface area of 410 m²/g;

60 μmol of 2,4,6-tris(4-aldehydephenyl)-1,3,5-triazine was dissolved in 50 ml of dioxane, added 120 μmol of 3-methylaniline and 120 μmol of 4-tert-butylbenzaldehyde to prepare a reaction solution;

60 mg (terephthalaldehyde, 2,4,6-tris(4-aminophenyl)-pyridine) COF was dispersed into the reaction solution, added 7.5 μmol indium trifluoromethanesulfonate, then reacted at 25° C. for 8 hours;

The COF obtained in the reaction was filtered by suction filtration, washed with acetone 3 times, dried under vacuum at 35° C., obtaining the hollow COF7 material.

The resulting hollow COF7 material has a particle size of 12100±2500 nm, a wall thickness of 1450 nm and a specific surface area of 1250 m²/g.

Example 8: Preparation of a Hollow COF8 Material 1 mmol of 2,4,6-tris(4-aldehydephenyl)-1,3,5-triazine and 1.5 mmol benzidine were dissolved in 35 ml of dioxane/mesitylene (in a volume ratio of 1/1), added 5 ml of acetic acid catalyst, reacted for 12 hours at room temperature, filtered and dried in a vacuum oven at 50° C. for 12 hours, obtaining the polycondensate: (2,4,6-tris(4-aldehydephenyl)-1,3,5-triazine, benzidine) COF, which is composed of solid spherical particles with a particle size of 1450 nm, and a specific surface area of 710 m²/g;

150 μmol of 2,4,6-tris(4-aminophenyl)-pyridine was dissolved in 100 ml of mesitylene/N,N-dimethylformamide (in a volume ratio of 1/2), added 375 μmol of 4-tert-butylaniline and 375 μmol benzaldehyde to prepare a reaction solution;

150 mg (2,4,6-tris(4-aldehydephenyl)-1,3,5-triazine, ben-zidine) COF was dispersed into the reaction solution, added 5 μmol scandium trifluoromethanesulfonate, then reacted at 30° C. for 12 hours;

The COF obtained in the reaction was filtered by suction filtration, washed with dioxane 3 times, dried under vacuum at 30° C., obtaining the hollow COF8 material.

The resulting hollow COF8 material has a particle size of 1570±120 nm, a wall thickness of 240 nm and a specific surface area of 1420 m$^2$/g.

Example 9: Preparation of a Hollow COF9

1 mmol tris(4-aminophenyl)-amine and 1.5 mmol of 2,5-dimethoxyterephthalaldehyde were dissolved in 150 ml of acetonitrile, added 25 ml of acetic acid catalyst, reacted for 5 hours at room temperature, filtered and dried in a vacuum oven at 50° C. for 12 hours, obtaining the polycon-densate (2,5-dimethoxyterephthalaldehyde, tris(4-amino-phenyl)-amine) COF, which is composed of solid spherical particles with a particle size of 900 nm, and a specific surface area of 560 m$^2$/g;

80 μmol tris(4-aldehydephenyl)-amine was dissolved in 40 ml of ethyl acetate/N,N-dimethylacetamide (in a volume ratio of 1/1), added 240 μmol 1-naphthylamine and 288 μmol of 2-naphthaldehyde to prepare a reaction solution;

72 mg (2,5-dimethoxyterephthalaldehyde, tris(4-amino-phenyl)-amine) COF was dispersed into the reaction solu-tion, added 8 μmol benzenesulfonic acid catalyst, then reacted at 35° C. for 36 hours;

The COF obtained in the reaction was filtered by suction filtration, washed with ethanol 3 times, dried under vacuum at 35° C., obtaining the hollow COF9 material.

The resulting hollow COF9 material has a particle size of 98070 nm, a wall thickness of 294 nm and a specific surface area of 1590 m$^2$/g.

Example 10: Preparation of a Hollow COF10 Material 1 mmol tris(4-aldehydephenyl)-amine and 1.5 mmol 4,4'-diaminoterphenyl were dissolved in 100 ml of acetonitrile, added 25 ml of acetic acid catalyst, reacted for 24 hours at room temperature, filtered and dried in a vacuum oven at 50° C. for 12 hours, obtaining the polycondensate (tris(4-alde-hydephenyl)-amine, 4,4'-diaminoterphenyl) COF, which is composed of solid spherical particles with a particle size of 400 nm, and a specific surface area of 810 m$^2$/g;

50 μmol of 1,3,5-tris(4'-amino[1,1'-biphenyl]-4-yl)-ben-zene was dissolved in 20 ml of dichlorobenzene/tert-butyl alcohol (in a volume ratio of 2/1), added 175 μmol butylam-ine and 260 μmol butyraldehyde to prepare a reaction solution;

40 mg (tris(4-aldehydephenyl)-amine, 4,4'-diaminoter-phenyl) COF was dispersed into the reaction solution, added 3.6 μmol trifluoroacetic acid, then reacted at 40° C. for 48 hours;

The COF obtained in the reaction was filtered by suction filtration, washed with acetone 3 times, dried under vacuum at 40° C., obtaining the hollow COF10 material.

The resulting hollow COF10 material has a particle size of 430±25 nm, a wall thickness of 150 nm and a specific surface area of 2100 m$^2$/g.

Example 11: Preparation of a Hollow COF11 Material 1 mmol of 1,3,5-tris(4'-amino[1,1'-biphenyl]-4-yl)-1,3,5-triazine and 1.5 mmol of 2,5-dialkynoxyterephthalaldehyde were dissolved in 80 ml of acetonitrile, added 15 ml of acetic acid to catalyze, reacted for 24 hours at room temperature, filtered and dried in a vacuum oven at 50° C. for 12 hours, obtaining the polycondensate (2,5-dialkynoxyterephthalal-dehyde, 1,3,5-tris(4'-amino[1,1'-biphenyl]-4-yl)-1,3,5-triaz-ine) COF, which is composed of solid spherical particles with a particle size of 130 nm, and a specific surface area of 310 m$^2$/g;

30 μmol of 1,3,5-tris(4'-aldehyde[1,1'-biphenyl]-4-yl)-benzene was dissolved in 10 ml of dichlorobenzene/tetra-hydrofuran (in a volume ratio of 2/1), added 120 μmol cyclohexylamine and 180 μmol acetaldehyde to prepare a reaction solution;

25 mg (2,5-dialkynoxyterephthalaldehyde, 1,3,5-tris(4'-amino[1,1'-biphenyl]-4-yl)-1,3,5-triazine) COF was dis-persed into the reaction solution, added 5 μmol acetic acid catalyst, then reacted at 60° C. for 2 hours;

The COF obtained in the reaction was filtered by suction filtration, washed with n-hexane 3 times, dried under vacuum at 40° C., obtaining the hollow COF11 material.

The resulting hollow COF11 material has a particle size of 150±30 nm, a wall thickness of 60 nm and a specific surface area of 780 m$^2$/g.

Example 12: Preparation of a Hollow COF12 Material 1 mmol of 1,3,5-tris(4'-aldehyde[1,1'-biphenyl]-4-yl)-pyridine and 1.5 mmol p-diaminoazobenzene were dis-solved in 80 ml of acetonitrile, added 15 ml of acetic acid catalyst, reacted for 24 hours at room temperature, filtered and dried in a vacuum oven at 50° C. for 12 hours, obtaining the polycondensate (1,3,5-tris(4'-aldehyde[1,1'-biphenyl]-4-yl)-pyridine, p-diaminoazobenzene) COF, which is com-posed of solid spherical particles with a particle size of 3400 nm, and a specific surface area of 1210 m$^2$/g;

210 μmol melamine was dissolved in 60 ml of chloro-form, added 1050 μmol aniline and 2100 μmol benzaldehyde to prepare a reaction solution;

180 mg (1,3,5-tris(4'-aldehyde[1,1'-biphenyl]-4-yl)-pyri-dine, p-diaminoazobenzene) COF was dispersed into the reaction solution, added 36 μmol acetic acid, then reacted at 80° C. for 11 hour;

The COF obtained in the reaction was filtered by suction filtration, washed with n-hexane 3 times, dried under vacuum at 60° C., obtaining the hollow COF12 material.

The resulting hollow COF12 material has a particle size of 3500±410 nm, a wall thickness of 1800 nm and a specific surface area of 2560 m$^2$/g.

Example 13: Preparation of a Hollow COF13 Material 1 mmol melamine and 1.5 mmol glyoxal were dissolved in 40 ml of acetonitrile, added 15 ml of acetic acid catalyst, reacted for 24 hours at room temperature, filtered and dried in a vacuum oven at 50° C. for 12 hours, obtaining the polycondensate (glyoxal, melamine) COF, which is com-posed of solid spherical particles with a particle size of 4700 nm, and a specific surface area of 340 m$^2$/g;

200 μmol of 1,3,5-tris(4'-aldehyde[1,1'-biphenyl]-4-yl)-amine was dissolved in 50 ml of dichlorobenzene/acetone (in a volume ratio of 2/1), added 1200 μmol aniline and 3600 μmol 4-fluorobenzaldehyde to prepare a reaction solution;

175 mg (glyoxal, melamine) COF was dispersed into the reaction solution, added 40 μmol methanoic acid catalyst, then reacted at 100° C. for 10 hours;

The COF obtained in the reaction was filtered by suction filtration, washed with n-hexane 3 times, dried under vacuum at 50° C., obtaining the hollow COF13 material.

The resulting COF13 material has a particle size of 4980±1200 nm, a wall thickness of 3200 nm and a specific surface area of 2780 $m^2$/g.

Example 14: Preparation of a Hollow COF14 Material 1 mmol 1,3,5-benzenetricarboxaldehyde and 1.5 mmol 2,6-anthracenediamine were dissolved in 30 ml of acetonitrile, added 9 ml of acetic acid catalyst, reacted for 24 hours at room temperature, filtered and dried in a vacuum oven at 50° C. for 12 hours, obtaining the polycondensate: (1,3,5-benzenetricarboxaldehyde, 2,6-anthracenediamine) COF, which is composed of solid spherical particles with a particle size of 19000 nm, and a specific surface area of 140 $m^2$/g;

100 μmol of 2,4,6-tris(4-aminophenyl)-pyrimidine was dissolved in 20 ml of toluene/ethyl ether (in a volume ratio of 1/1), added 800 μmol ethylamine and 4000 μmol of 3-methylbenzaldehyde to prepare a reaction solution;

80 mg (1,3,5-benzenetricarboxaldehyde, 2,6-anthracenediamine) COF was dispersed into the reaction solution, added 20 μmol methylbenzenesulfonic acid catalyst, then reacted at 120° C. for 70 hours;

The COF obtained in the reaction was filtered by suction filtration, washed with ethanol 3 times, dried under vacuum at 60° C., obtaining the hollow COF14 material.

The resulting hollow COF14 material has a particle size of 194009800 nm, a wall thickness of 4000 nm and a specific surface area of 530 $m^2$/g.

Example 15: Preparation of a Hollow COF15 Material 1 mmol of 1,3,5-tris(4-aminophenyl)benzene and 1.5 mmol terephthalaldehyde were dissolved in 30 ml of acetonitrile, added 70.0 μmol of scandium trifluoromethanesulfonate catalyst, reacted for 24 hours at room temperature, filtered and dried in a vacuum oven at 50° C. for 12 hours, obtaining the polycondensate: (terephthalaldehyde, 1,3,5-tris(4-aminophenyl)benzene) COF, which is composed of solid spherical particles with a particle size of 14700 nm, and a specific surface area of 120 $m^2$/g;

480 μmol of 2,4,6-trihydroxy-1,3,5-benzenetricarboxaldehyde was dissolved in 60 ml of acetonitrile, added 4800 μmol ethylamine and 4800 μmol propionaldehyde to prepare a reaction solution;

300 mg (terephthalaldehyde, 1,3,5-tris(4-aminophenyl) benzene) COF was dispersed into the reaction solution, added 120 μmol trifluoroacetic acid, then reacted at 140° C. for 24 hours;

The COF obtained in the reaction was filtered by suction filtration, washed with ethanol 3 times, dried under vacuum at 40° C., obtaining the hollow COF15 material.

The resulting hollow COF15 material has a particle size of 153003700 nm, a wall thickness of 2500 nm and a specific surface area of 690 $m^2$/g.

Example 16: Preparation of a Hollow COF16 Material 1 mmol of 2,4,6-tris(4-aldehydephenyl)-pyrimidine and 1.5 mmol 1,2-cyclohexanediamine were dissolved in 30 ml of acetonitrile, added 70.0 μmol of scandium trifluoromethanesulfonate catalyst, reacted for 24 hours at room temperature, filtered and dried in a vacuum oven at 50° C. for 12 hours, obtaining the polycondensate: (2,4,6-tris(4-aldehydephenyl)-pyrimidine, 1,2-cyclohexanediamine) COF, which is composed of solid spherical particles with a particle size of 650 nm, and a specific surface area of 1300 $m^2$/g;

800 μmol tris(4-aminophenyl)-amine was dissolved in 80 ml of heptane/tetrahydrofuran (in a volume ratio of 1/1), added 24000 μmol aniline and 24000 μmol benzaldehyde to prepare a reaction solution;

640 mg (2,4,6-tris(4-aldehydephenyl)-pyrimidine, 1,2-cyclohexanediamine) COF was dispersed into the reaction solution, added 160 μmol acetic acid catalyst, then reacted at 150° C. for 36 hours;

The COF obtained in the reaction was filtered by suction filtration, washed with acetone 3 times, dried under vacuum at 50° C., obtaining the hollow COF16 material.

The resulting hollow COF16 material has a particle size of 680±43 nm, a wall thickness of 510 nm and a specific surface area of 2390 $m^2$/g.

Example 17: Preparation of a Hollow COF17 Material 1 mmol of 1,3,5-tris(4-aminophenyl)benzene and 1.5 mmol of 2,5-dihydroxyterephthalaldehyde were dissolved in 80 ml of acetonitrile, added 40.0 μmol of scandium trifluoromethanesulfonate catalyst, reacted for 24 hours at room temperature, filtered and dried in a vacuum oven at 50° C. for 12 hours, obtaining the polycondensate: (2,5-dihydroxyterephthalaldehyde, 1,3,5-tris(4-aminophenyl)benzene) COF, which is composed of solid spherical particles with a particle size of 900 nm, and a specific surface area of 680 $m^2$/g;

500 μmol 1,3,5-benzenetricarboxaldehyde was dissolved in 20 ml of N,N-dimethylacetamide, added 25000 μmol aniline and 25000 μmol benzaldehyde to prepare a reaction solution;

200 mg (2,5-dihydroxyterephthalaldehyde, 1,3,5-tris(4-aminophenyl)benzene) COF was dispersed into the reaction solution, added 60 μmol acetic acid, then reacted at 100° C. for 48 hours;

The COF obtained in the reaction was filtered by suction filtration, washed with n-hexane 3 times, dried under vacuum at 60° C., obtaining the hollow COF17 material.

The resulting hollow COF17 material has a particle size of 920±140 nm, a wall thickness of 730 nm and a specific surface area of 1860 $m^2$/g.

Example 18: modification of solid (1,3,5-tris(4-aminophenyl) benzene, terephthalaldehyde) COF material of the prior art The COF material of the prior art: (1,3,5-tris(4-aminophenyl)benzene, terephthalaldehyde) COF material, which is a solid spherical COF material with a particle size of 110 nm and a specific surface area of 890 $m^2$/g, can be obtained by the method disclosed in Li, R. et al., "Controlled Growth of Imine-Linked Two-Dimensional Covalent Organic Framework Nanoparticles", Chemical Science, 2019, No. 10, pages 3796-3801;

40.0 μmol 1,3,5-benzenetricarboxaldehyde was dissolved in 20 ml of dioxane/mesitylene (in a volume ratio of 1/2), added 1.2 mmol aniline and 1.2 mmol benzaldehyde to prepare a reaction solution;

40 mg (1,3,5-tris(4-aminophenyl) benzene, terephthalaldehyde) COF was dispersed into said reaction solution, added 3.0 μmol scandium trifluoromethanesulfonate, then reacted at 25° C. for 24 hours;

The COF obtained in the reaction was filtered by suction filtration, washed with ethanol 3 times, dried under vacuum at 40° C., obtaining the hollow COF18 material.

The resulting hollow COF18 material has a particle size of 120±8 nm, a wall thickness of 25 nm and a specific surface area of 1456 m²/g.

Example 19: Modification of Hollow (1,3,5-Benzenetricarboxaldehyde, p-Phenylenediamine) COF Material of the Prior Art The COF material of the prior art: (1,3,5-benzenetricarboxaldehyde, p-phenylenediamine) COF material, which is a hollow spherical COF material with a wall thickness of 70 nm, a particle size of 400 nm, and specific surface area of 410 m²/g can be obtained by the method disclosed in Ding, S. Y. et al., "Construction of Covalent Organic Framework for Catalysis: Pd/COF-LZU1 in Suzuki-Miyaura Coupling Reaction", Journal of the American Chemical Society, 2011, No. 133, pages 19816-19822;

40.0 μmol of 1,3,5-tris(4-aminophenyl) benzene was dissolved in 20 ml of dioxane/mesitylene (in a volume ratio of 1/2), added 1.2 mmol aniline and 1.2 mmol benzaldehyde to prepare a reaction solution;

40 mg (1,3,5-benzenetricarboxaldehyde, p-phenylenediamine) COF was dispersed into said reaction solution, added 3.0 μmol scandium trifluoromethanesulfonate, then reacted at 25° C. for 24 hours;

The COF obtained in the reaction was filtered by suction filtration, washed with ethanol 3 times, dried under vacuum at 40° C., obtaining the hollow COF19 material.

The resulting hollow COF19 material has a particle size of 41026 nm, a wall thickness of 70 nm and a specific surface area of 1210 m²/g.

The technical solutions of the above-described examples are preferred embodiments of present invention, and several modifications and changes can be made without departing from the principle of present invention, and these modifications and changes should also be read as being within the scope of present invention.

The invention claimed is:

1. A method for preparing hollow COF material, comprising:

a. subjecting trialdehyde monomer B3 and diamine monomer A2 to polycondensation to obtain a polycondensate B3A2, or subjecting dialdehyde monomer B2 and triamine monomer A3 to polycondensation to obtain a polycondensate B2A3;

b. dissolving triamine monomer A3 into a solvent and adding modifiers AP and BP to obtain reaction solution 1; or dissolving trialdehyde monomer B3 into a solvent and adding modifiers AP and BP to obtain reaction solution 2, wherein said modifier AP is selected from aromatic aldehydes and aliphatic aldehydes, and said modifier BP is selected from aromatic amines and aliphatic amines;

c. dispersing polycondensate B3A2 into the reaction solution 1, or dispersing polycondensate B2A3 into the reaction solution 2, and adding a catalyst to initiate a reaction, thereby obtaining a product in form of a precipitate; and d. after the reaction, separating the resulting product and drying to obtain the hollow COF material;

wherein the concentration of said triamine monomer A3 or trialdehyde monomer B3 in the reaction solution 1 or 2 is 0.01-100 mM, the molar ratio of said modifier BP to trialdehyde monomer B3 or triamine monomer A3 is 0.01-200:1, and the molar ratio of said modifier AP to BP is 0.01-100:1.

2. The method according to claim 1, wherein said dialdehyde monomer B2 is selected from terephthalaldehyde, 2,5-dimethoxyterephthalaldehyde, and biphenyldicarboxaldehyde.

3. The method according to claim 1, wherein said triamine monomer A3 is selected from 1,3,5-tris(4-aminophenyl) benzene, 2,4,6-tris(4-aminophenyl)-1,3,5-triazine, 2,4,6-tris (4-aminophenyl)-pyridine, 2,4,6-tris(4-aminophenyl)-pyrimidine, and tris(4-aminophenyl)-amine.

4. The method according to claim 1, wherein said diamine monomer A2 is selected from 1,4-phenylene diamine, 2,5-dimethyl-1,4-phenylene diamine, tetramethyl-p-phenylendiamine, and benzidine.

5. The method according to claim 1, wherein said modifier AP is selected from benzaldehyde, 2-chlorobenzaldehyde, 3-chlorobenzaldehyde, 4-chlorobenzaldehyde, 2-nitrobenzaldehyde, 3-nitrobenzaldehyde, 4-nitrobenzaldehyde, 2-methylbenzaldehyde, 3-methylbenzaldehyde, 4-methylbenzaldehyde, 4-tert-butylbenzaldehyde, 4-fluorobenzaldehyde, 1-naphthaldehyde, 2-naphthaldehyde, formaldehyde, acetaldehyde, propionaldehyde, butyraldehyde, valeraldehyde, capronaldehyde, heptaldehyde, caprylaldehyde, and any mixtures thereof.

6. The method according to claim 1, wherein said modifier BP is selected from aniline, 2-chloroaniline, 3-chloroaniline, 4-chloroaniline, 1,3-benzothiazol-5-amine, 2-nitroaniline, 3-nitroaniline, 4-nitroaniline, 2-methylaniline, 3-methylaniline, 4-methylaniline, 4-tert-butylaniline, 4-fluoroaniline, 1-naphthylamine, 2-naphthylamine, methylamine, ethylamine, propylamine, butylamine, pentylamine, hexylamine, heptylamine, octylamine, cyclohexylamine, and any mixture thereof.

7. The method according to claim 1, wherein trialdehyde monomer B3 are selected from 1,3,5-benzenetricarboxaldehyde, 1,3,5-tris(4-aldehydephenyl) benzene, 2,4,6-tris(4-aldehydephenyl)-1,3,5-triazine, 2,4,6-tris(4-aldehydephenyl)-pyridine, 2,4,6-tris(4-aldehydephenyl)-pyrimidine, and tris (4-aldehydephenyl)-amine.

8. The method according to claim 1, wherein the concentration of said triamine monomer A3 or trialdehyde monomer B3 in the reaction solution 1 or 2 is 0.2-25 mM.

9. The method according to claim 1, wherein the molar ratio of said modifier BP to trialdehyde monomer B3 or triamine monomer A3 is 0.5-50:1.

10. The method according to claim 1, wherein the molar ratio of said modifier AP to BP is 0.2-5:1.

* * * * *